May 13, 1969 R. HAYDEN 3,444,515
FLASHING DEVICE

Filed Feb. 21, 1966 Sheet 1 of 2

INVENTOR:
RODNEY HAYDEN
BY: Philip E. Parker

INVENTOR:
RODNEY HAYDEN
BY: Philip E. Parker

United States Patent Office 3,444,515
Patented May 13, 1969

3,444,515
FLASHING DEVICE
Rodney Hayden, Stoney Creek, Ontario, Canada, assignor, by mesne assignments, to United-Carr Incorporated, Boston, Mass., a corporation of Delaware
Filed Feb. 21, 1966, Ser. No. 529,053
Claims priority, application Canada, Jan. 13, 1966, 949,774
Int. Cl. B60q 1/52
U.S. Cl. 340—74                                   1 Claim

ABSTRACT OF THE DISCLOSURE

This is a flasher unit for use with a vehicle lighting system utilizing a flasher bulb having a bimetallic element therein in series with a switch and a relay coil. Actuation of the relay coil provides the initial electrical contact between the bulb, the source of power and directional switching devices.

---

This invention relates to improvements in flasher units for use with vehicle lighting systems, wherein the flasher unit provides an interrupted current flow to the lighting system, thereby to provide a hazard warning in the event that the vehicle is stopped on a roadway after dark.

It is conventional practice in providing flasher systems for vehicle signal lamps to utilize separate units in the form of switches and flasher units, wired together to give the desired result. Thus, in one type of conventional system a separate manual switch is provided for connecting the vehicle lamps which are to be incorporated in the flashing system to a central lead which is thereafter supplied to a separate flashing unit, this unit usually being installed within the automobile somewhat remote from the manual switch. In addition, a fuse link together with any necessary electrical connectors are also provided with the result that installation of a conventional blinker system onto an automobile involves considerable cost in installation time and in many cases presents an untidy appearance within the passenger compartment.

A further disadvantage results from the rather high cost due to the separate units provided. It will be appreciated that each individual unit requires an envelope plus mounting means and further requires electrical leads for connection to the rest of the units in the system. Whereas the use of separate units permits the installation of a blinker system utilizing shelf items, any advantages to be thus gained are far outweighed by the cost factor of the individual unit.

By resort to the present invention however, a blinker system in the form of a hazard warning device can be incorporated onto a vehicle and into the existing wiring system at comparatively small cost and with comparatively little labour. The invention provides a hazard warning device having the operative parts thereof contained within a single envelope, whereby the total cost of the system is substantially reduced as compared to the individual unit system heretofore in use.

An important object of the invention is to provide a hazard warning device comprising a single envelope containing means whereby a single current flow to the device is controlled to provide an intermittent signal to the lamps required in the flashing system. By resort to the present invention a single device can be mounted within the passenger compartment of a vehicle, accessible to the operator, whereafter the necessary wiring can be incorporated thereby to provide a flashing lamp system on the vehicle.

Other objects and features of the invention will be apparent from the following detailed description and accompanying drawings in which like numerals refer to like parts thereof throughout the various views and diagrams, and in which.

Figure 6:
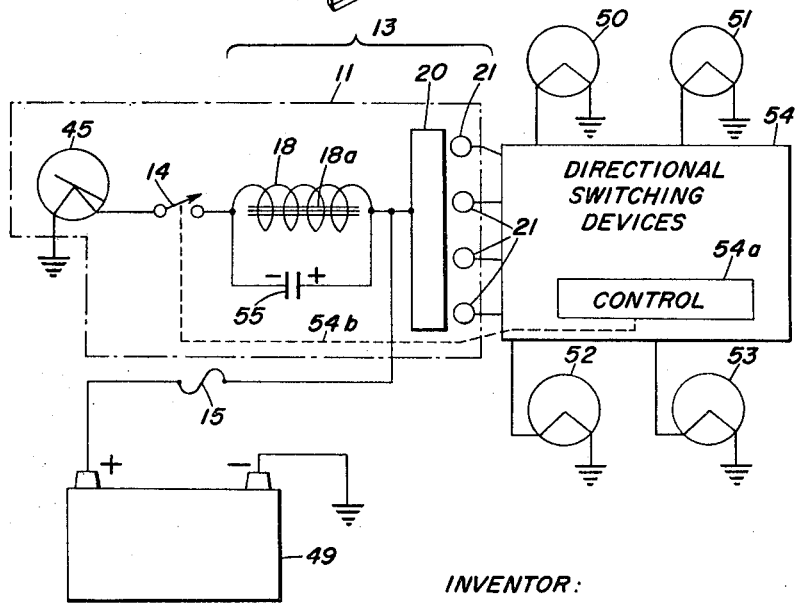
Figure 7:
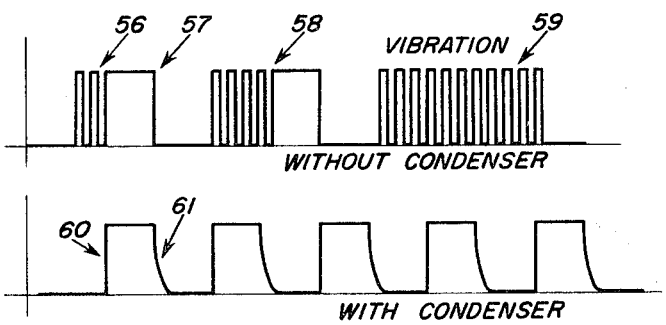

FIGURE 6 (shown on the first sheet of drawings with FIGURE 1 and FIGURE 2) is a wiring diagram according to the present invention; and, FIGURE 7 is a diagram illustrating the effect of incorporating a condenser shunting the relay coil.

Figure 1:
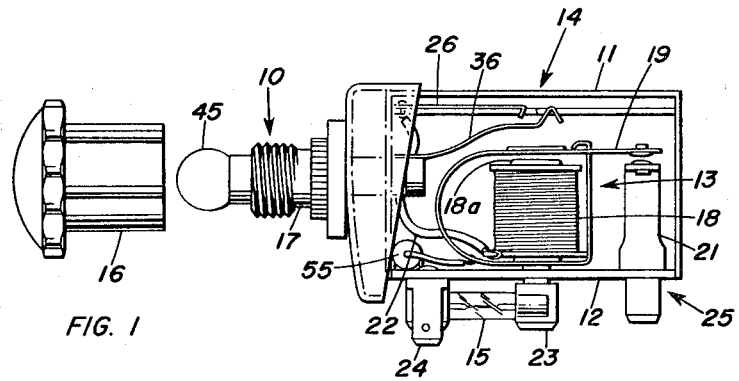
FIGURE 1 is a cut-away side elevation of a hazard warning device according to the present invention.

With reference to FIGURE 1 a hazard warning device is illustrated and indicated generally as 10. The device 10 comprises an envelope in the form of the box 11 provided with the lower closure plate 12. Box 11 contains the relay unit 13, the manual switch contacts at 14, the closure member 12 being provided with the line fuse 15, the push pull knob 16 being threadably removable from the barrel 17.

Figure 2:
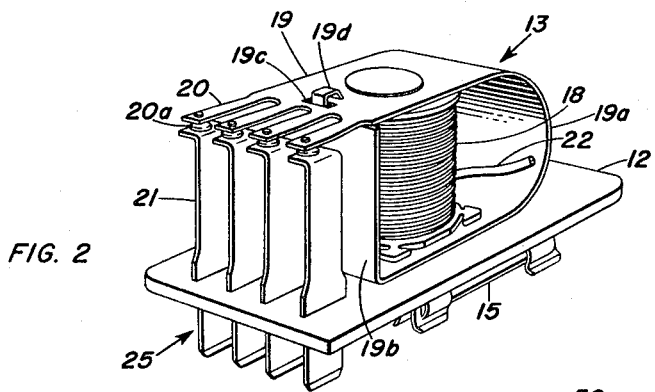
FIGURE 2 is a perspective view of a relay unit suitable for use with this invention.

With particular reference to FIGURE 2 the relay unit 13 comprises coil 18 secured to the base member 12 and provided with the armature 19 formed thereover to terminate in the contact fingers 20. A plurality of contact pins 21 are secured to the base member 12 and project upwardly to register with the fingers 20. The relay 13 is of the normally open type and upon being energized the fingers 20 contact the pins 21, thereby to electrically connect all pins 21 to the common electrical contactor which in this case is the armature 19. The relay coil 18 is provided with current through the wire lead 22 the other lead being the common return armature 19. Thus, the common connector for all pins 21 and the relay coil 18 is the armature 19 which in turn is connected to the terminal 23 securing one end of the fuse 15. The clamp 24 securing the remaining end of the fuse 15 serves as the current input into the device 10, the pins 21 at their outer extremities as at 25 being the output end of the device. Each of the pins 21 are connected to a switch (not shown) which in turn is connected to one of the bulbs 50–53.

From the drawing it will be seen that the relay according to the present invention is constructed in a novel manner wherein the armature or obturator 19 is formed of a continuous length of material, which is preferably a length of spring strip low carbon ferrous material of high hardness. The obturator or armature is formed having a free arcuate portion 19a extending substantially 180 degrees from the contacts 20a about coil 18 to terminate in a bracket arm 19b extending upwardly through hole 19c by flange 19d to space the obturator 19 from the core 18a of coil 18.

It is preferable to provide a separate contact finger and terminal 20, 21, for each of the expected circuits, which in this case comprises the four lamp circuits as shown in FIGURE 6. Thus by utilizing a separate electrical contact for each circuit the amperage load can be divided between contacts thereby to provide a relay having a comparatively long life and eliminate a requirement for a heavy single pole switch.

Figure 3:
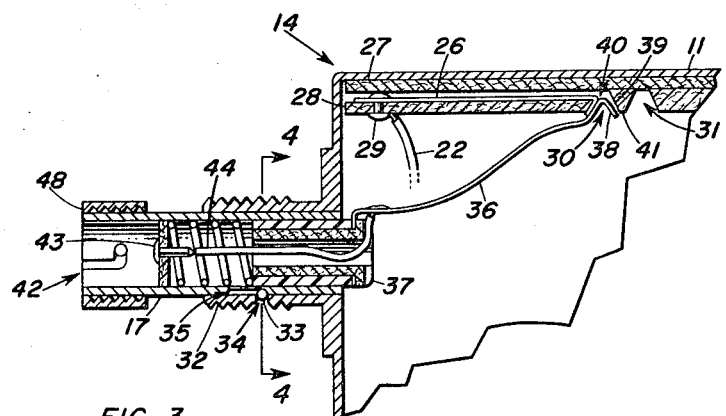
FIGURE 3 is an enlarged sectional view through the manual switch means used with this invention.
Figure 4:
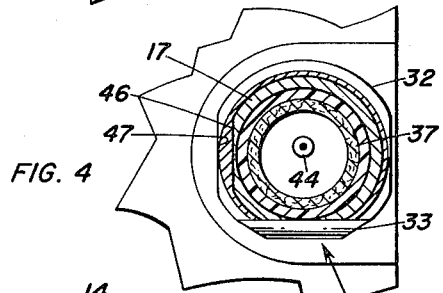
FIGURE 4 is a section along the line 4—4 of FIGURE 3.
Figure 5:
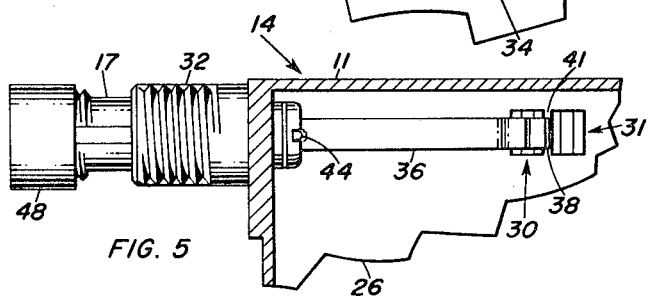
FIGURE 5 is a fragmentary plan view of the switch unit as shown in section in FIGURE 3.

With further reference to FIGURE 1 and particular reference to FIGURE 3, FIGURE 4 and FIGURE 5, the manual switching means for use with the present invention is illustrated. Switching means 14 comprises stationary contact 26 sandwiched between insulating layer 27 and insulating layer 28 and provided with the securing pin 29 which also serves as the electrical connection thereto. A pair of indentations or slots at 30 and 31 within the insulating layer 28 provide the off and on position for this manual switch 14.

Movable barrel member 17 is adapted to reciprocate within the boss 32 which forms part of the box 11. The barrel 17 is limited in linear movement by the pin 33 held in the slot 34 of boss 32 and cooperating with the slot 35 in barrel 17. Movable switch element 36 which is formed from a resilient material such as for instance Phosphor bronze is secured by means of the insulating plug 37 onto the interior end of barrel 17 and extends to be in contact with stationary contact 26 in the switch on position as shown in FIGURE 3. Switch element 36 is provided with the lip as at 38 which in the switch on position is resiliently biased against the side 39 of slot 30 to force the element 36 into electrical contact as at 40 with the stationary element 26. By manual depression of barrel 17 inwardly the lip 38 is caused to ride over the mid-portion 41 of insulating layer 27 and to drop into slot 31, this being the switch off position.

A conventional bayonet type socket as at 42 is provided in the exterior end of barrel 17 wherein the spring loaded contact 43 is connected to element 36 by means of the connecting conductor wire 44. The bulb 45 as shown in FIGURE 1 is of the incandescent light type and is a flashing type bulb which incorporates a separate flashing switch therein. The type of bulb selected depends upon the circuit to be used with the device, as shown in FIGURE 6.

Other features of manual switch 14 includes a flat portion 46 on the barrel 17 which cooperates with the flat portion 47 within the boss 32 in order to prevent rotational movement of barrel 17, thereby to ensure alignment of the stationary member 26 with the movable member 36 thus to ensure good electrical contact. In addition, the end 48 of barrel 17 is threaded to receive the knob 16, this knob being transparent or at least translucent and preferably coloured to provide visual display operative while the device 10 is operative, whereby the flashes are clearly visible to the operator.

With reference to FIGURE 6 a wiring diagram is illustrated which shows the electrical connections of the units for the warning device 10. In the diagram power is supplied to the device by means of the battery 49 through the fuse 15. In this embodiment the relay coil 18 is wired in series with the manual switch 14 and lamp 45 and the making of the contact on pins 21 will supply current from battery 49 to the individual lamp circiuts 50, 51, 52 and 53, through the conventional directional switching device 54. Current flowing through the flasher bulb 45 will heat the bimetal element therein and cause an interruption in the current which will thus cause relay 13 to drop out and break the circuit to the individual vehicle bulbs. The make and break of the circuit by bulb 45 will continue at a rate characteristic of the bulb as long as the switch 14 remains closed. Opening of the switch 14 will shut the entire unit off.

Due to the intermittent nature of current flow in relay coil 18 it is preferable to provide a condenser 55 across the coil terminals. The condenser 55 serves to smooth out EMF voltages induced during rapid fluctuation in currents through the coil 18, thereby to reduce the effects of increased voltage on the flasher bulb 45.

With reference to FIGURE 7 diagrams illustrating the effect of the condenser 55 are shown. In the upper diagram the line shows voltage fluctuations during the closing and opening of the flasher lamp 45 contacts. At the beginning of a flashing cycle the contacts closing in the lamp cause a rapid fluctuation as indicated at 56 in the voltage, the current at this point not being sufficient to maintain the relay 13 closed. As shown at 57 the contacts finally close sufficiently long to provide enough current to close the relay 13.

This condition persists as shown at 58 and eventually a chattering effect takes place as shown at 59. This vibration within the circuit prevents the rleay coil from closing positively and thus prevents the system from flashing as required.

The lower diagram is pictorial of the condition which exists upon the condenser 55 being put in place across the coil 18 terminals. The operation of the condenser is two fold in that it protects the flasher lamp 45 from high, induced voltages produced in the coil due to the break portion of the cycle, and also smooths out the voltage variations as shown in the lower diagram in FIGURE 7. While a resistor in circuit would accomplish a similar result of protecting flasher lamp 45 from high voltages, the resistor would not produce the desired smoothing of voltage variations as shown at 60 and 61 in the lower diagram.

Another feature of the invention is to be found in the provision of the flasher bulb 45 in circuit with the coil 18. When the lamp is cold it has a low resistance of about one-sixteenth the hot resistance. Upon the switch 14 being closed a comparatively heavy flow of current passes through the coil 18 at nearly twice normal operating voltage to provide positive closure of the relay. The warm up of the lamp takes place in about ten milliseconds and for this reason the heavier flow of overload currents through the coil is of comparatively short duration and thus does not damage the coil. This feature available from the characteristics of an incandescent lamp filament used as a quick changing load resistance ensures positive closure of the relay coil by an in circuit pulse of energy especially effective to ensure reliability in spite of aging, low temperature weather conditions or a weak battery.

While a thermal relay could be considered for replacing the lamp 45 it should be noted that such a relay would not have the same degree of differential between the hot and cold resistance. If the flasher bulb 45 were replaced by such a relay, the circuit would not have the benefit of high starting voltage to close the relay coil combined with the rapid heating and subsequent decay to design voltage.

For a whole cycle, that is from the beginning of the switch make to the end of the switch break in the flasher lamp, the make portion approximates one-sixteenth of the cycle frequency for the flasher lamp. The time constant of the condenser 55 is selected approximately equal to the length of this make, that is the time constant for the condenser is approximately one-sixteenth the full cycle frequency.

It is preferable in providing the relay operating coil 18 to size the DC resistance of this coil approximating the magnitude of the resistance of the flasher lamp 45. By matching the coil resistance with the flasher lamp resistance in this manner, a flasher lamp normally operative on a six volt circuit can be utilized with the conventional twelve volt circuit. The cost of the unit is thus further reduced by utilizing readily available flasher lamps without resort to procurement or manufacture of more expensive, specially designed flasher units.

In general, the hazard warning device has an operating unit which is driver controlled and is adapted to flash selected vehicle lights simultaneously to indicate the presence of a hazard to other drivers. The indicator lamp flashes simultaneously with the exterior lights and does so at a rate of from 60 to 100 flashes per minute with an approximate on-time of 30 to 75 percent. The unit will operate the outside lights simultaneously and will continue to operate such lights even though one or more of the lights may fail. In addition, the flashing activator, that is the flasher lamp, is a replaceable, hermetically sealed unit unaffected by dirt and dust and operating on the same circuit as the relay coil thus uses a minimum amount of current. By resort to the use of a relay as illustrated in the drawings, there are provided four sets of metal contacts instead of a single contact as is normally found in prior types of signal devices.

As an example of a preferred form of the invention a relay coil is provided having approximately 1100 turns of number 30 wire, the coil thus drawing 500 ma. at 6 volts with a resistance of 12 ohms. A flasher lamp having a reading of approximately three hundred milliamperes is used in circuit as illustrated and an electrolytic condenser having a rating of 50 mfd. at 10 volts is used as shown. This flasher has been found entirely satisfactory for the purposes of the invention and has been operated in excess of one-half million cycles.

In the directional switching devices 54 comprise conventional directional switch mechanisms having a manual or other control 54a shown mechanically linked by linkage 54b to switch 14 above described to actuate same for generating a flashing current as required for lamp circuits 50, 51, 52 and 53. In other words, the linkage 54b mechanically connects the control 54a with the switch 14. Whether the control is actuated for the hazard warning mode or as a directional signal for the left or right, the linkage operates to close the switch 14.

In use, the present invention can be installed within the passage compartment of a vehicle, a convenient place in an automobile being under the dash adjacent to the operator's seat. The main power lead can be connected to the terminal 24 and the individual leads to the lamps which are to be included in the flashing circuit can be connected to the terminals at 25. The circuit as shown in FIGURE 6 can be utilized and upon the switch 14 having been placed in the closed position by pulling on the knob 16 the circuit will flash according to the arrangement of parts as per FIGURE 6.

The types of flasher lamps commercially available are normally inconsistent in operation. During the closing portion of the cycle much interruption and variation in current flow is experienced. While available flasher bulbs are comparatively cheap, unreliable closure is found to adversely affect the operation of the relay. However, a relay coil shunting condenser of this invention enables reliability and consistency of operation to be achieved. From this it can be seen that not only is the flasher lamp of importance to the present invention but also the relay coil shunt condenser entered into the unique combination of components herein to enable an inexpensive and reliable result to be obtained.

From the foregoing it will be seen that the present invention provides a flashing device for use with an automotive vehicle lamp system including a source of electric power, the device comprising a lamp, a control switch and relay coil in series with the flasher lamp to be powered by such source of power, and a condenser in parallel with the coil having a time constant of about one-sixteenth the total cycle frequency.

It will be further understood that the flashing device of the invention is interposed between the switching devices which control the distribution of current to the lamp circuits and the source of direct current battery power in the automobile. Thus the contact means of the relay interrupts the flow of current to the switching devices intermittently to deliver flashing pulses from the battery power through the switching devices to the lamp circuits. The flashing device of the invention controls the closing of the normally open contacts of the relays to provide the intermittent flashing function. The flashing device of the invention is in its own separate circuit arrangement with the battery power source or other power source in such manner that a thermal resistance having a hot resistance and a lower cold resistance such as the incandenscent lamp disclosed herein is placed electrically in series with the relay coil whereby the direct current resistance of the relay coil and the cold resistance of the thermal resistance or incandescent lamp are divided across the voltage of the battery power source. Of the various kinds of thermal resistances which might be employed an incandescent lamp having a ratio of hot resistance to cold resistance of the order of 10:1 or 20:1 enables a large proportionate share of the battery voltage to be applied to the relay coil as an initial pulse during the heating of the lamp to incandescence in a fraction of a second during which the coil is overloaded to an amount insufficient to damage the coil or overheat same but sufficient to provide a very strong positive magnetic pulse effecting closing of the relay contacts in a very short period of time. The invention also embodies within the flashing device a thermal switch which in the preferred form disclosed is found within the structure of the thermal resistance lamp, which again in the most preferred form is a flasher lamp of known construction. The thermal switch thus is in series circuit with the lamp or thermal resistance and responsive to current flow to the thermal resistance opens to interrupt the electrical current flow thereto and to the relay coil but recovers its normal closed circuit condition due to cooling when no current is flowing, thereby again to re-open and close thereafter at a flashing rate simultaneously intermittently energizing said relay coil and thermal resistance. The inclusion of the thermal switch within the thermal resistance incandescent lamp is preferred for the reason that such combined structure enables protection for the thermal switch and switching action within a vacuum while the same may be of light and sensitive construction at relatively low cost and satisfactory flashing frequency of the order of between about forty flashes per minute and one hundred and fifty flashes per minute. Furthermore, a flasher lamp may be located as a flashing indicator within the automobile itself.

What I claim is:

1. A flashing device connectable between a source of direct current power and switching devices controlling the distribution of power to lamp circuits of an automobile and comprising: a normally open electrical relay having contact means thereon connected between the power source and the lamp circuit switch devices; an actuating coil for said relay of substantially constant direct current resistance adapted when energized to close the contacts of said relay; a normally closed thermal resistance having a hot resistance and a lower cold resistance in the form of an incandescent lamp adapted to be used as a flashing indicator; a manually actuated switch and the normally closed thermal switch electrically in series with said coil and thermal resistance and connectable to divide the voltage of the power source between the thermal resistance and the relay coil according to the resistance of each, said thermal switch being adapted to open responsive to heat generated by flow of electrical current to said thermal resistance and upon cooling to close and again reopen and close thereafter at a flashing rate simultaneously intermittently energizing said relay coil and thermal resistance, said manually actuated switch located electrically between the incandescent lamp and the coil and comprising a stationary contact and a movable switch element attached to a carrier which has the incandescent lamp engaged therewith whereby movement of the carrier a predetermined distance will engage the movable switch element with the stationary contact.

(References on following page)

References Cited

UNITED STATES PATENTS

| | | | |
|---|---|---|---|
| 1,998,072 | 4/1935 | Blake et al. | 340—375 X |
| 3,080,554 | 3/1963 | Jacobel et al. | 340—381 X |
| 2,562,272 | 7/1951 | Hollins | 340—81 X |
| 2,659,071 | 11/1953 | Dohm. | |
| 2,799,786 | 7/1957 | Ellenberger | 340—80 X |
| 2,892,996 | 6/1959 | Hollins | 340—74 X |
| 3,316,534 | 4/1967 | Hollins | 340—74 |

FOREIGN PATENTS

| | | |
|---|---|---|
| 791,114 | 2/1958 | Great Britain. |
| 163,749 | 2/1958 | Sweden. |

THOMAS A. ROBINSON, *Primary Examiner.*

U.S. Cl. X.R.

340—81, 331